United States Patent [19]

Mercat

[11] Patent Number: 4,966,380
[45] Date of Patent: Oct. 30, 1990

[54] DRIVING WHEEL FOR A BICYCLE OR THE LIKE, INCLUDING A SENSOR FOR MEASURING THE TRANSMITTED TORQUE, AND A BICYCLE EQUIPPED WITH SUCH A WHEEL

[75] Inventor: Jean-Pierre Mercat, Chateau-Renault, France

[73] Assignee: STE Look rue de la Pigue, France

[21] Appl. No.: 343,946

[22] Filed: Apr. 25, 1989

[30] Foreign Application Priority Data

May 17, 1988 [FR] France ................................ 88 06567

[51] Int. Cl.$^5$ ........................... G01L 3/14; B62M 1/02
[52] U.S. Cl. .................................... 280/259; 73/862.19
[58] Field of Search ............ 73/862.19, 862.31, 862.34; 74/337, 337.5; 280/259

[56] References Cited

U.S. PATENT DOCUMENTS 3,881,347 5/1975 Buchele ............................ 73/862.19

FOREIGN PATENT DOCUMENTS 3150149 6/1983 Fed. Rep. of Germany .
3504047 2/1988 Fed. Rep. of Germany .
2394790 1/1979 France .

Primary Examiner—Charles A. Marmor
Assistant Examiner—Alan M. Kagen

[57] ABSTRACT

The hub (3) of the bicycle (1) is connected to a chain-driven sprocket (10, 12) through a sleeve (11) carrying the sprocket(s), and through a driving mechanism which comprises a driving member (15) slidable inside the sleeve (11) and driven in rotation by this sleeve, and a driven member (16) slidable on the fixed axle (8) of the hub. The driving member (15) and the driven member (16) which is linked to the hub (3) through a free-wheel device (19, 24, 25) both carry cams (27) producing an axial thrust which pushes these members (15, 16) apart when they are rotated. This axial thrust is applied through a thrust bearing (33-36) to a sensing device comprising a strain gauge (29) mounted on a flexible non-rotating disk (28) carried on the fixed axle (8). Signals from the sensor are processed by a measuring and display device (6) attached to the handlebar, so that the rider may know at all times the value of the torque transmitted to the wheel.

10 Claims, 5 Drawing Sheets

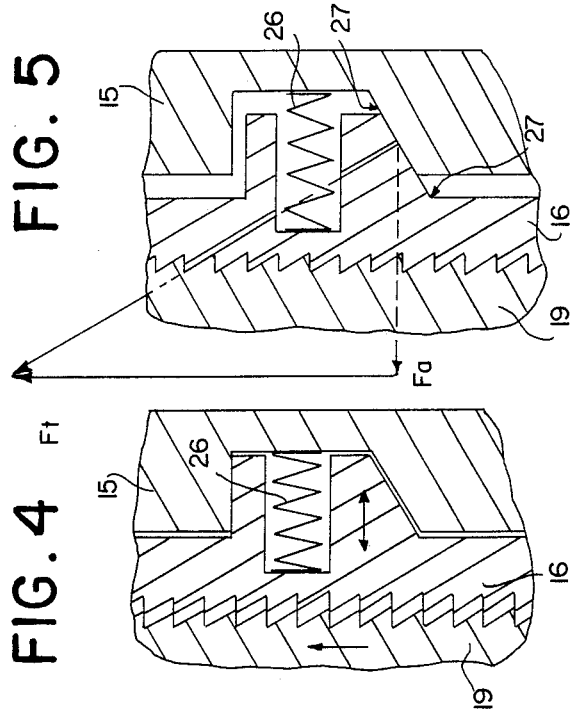

DRIVING WHEEL FOR A BICYCLE OR THE LIKE, INCLUDING A SENSOR FOR MEASURING THE TRANSMITTED TORQUE, AND A BICYCLE EQUIPPED WITH SUCH A WHEEL

FIELD OF THE INVENTION

This invention concerns the measurement of the torque transmitted by a driving wheel, more particularly by the driving wheel of a bicycle.

Measurement of the power developed and/or of the energy expended by a cyclist presents a primordial interest in the case of a racing cyclist in the course of training. This measurement is also highly desirable for persons who practice cycling for physical rehabilitation after an accident, or else as a help in the treatment of certain blood circulation complaints, or simply for improving their physical condition. This is why there already exists a certain number of devices specially designed for the measurement of the torque transmitted in a bicycle.

PRIOR ART

FR No. 2,394,790 discloses a device designed for measuring the torque transmitted by the driving chain, by measuring the tension of the driving strand of this chain. This device comprises a roller pressed by a spring against the driving strand of the chain. As the stress transmitted by the chain increases, its driving strand tautens and pushes back the spring of the measuring device. Thus, there exists a rule of correspondence between the deflection of the spring and the stress transmitted by the driving strand of the chain.

However, such a device only gives indications which are most imprecise, because of the spurious effects of the vibrations in the operation of the chain. Also, the stress being measured is the one transmitted by the chain. Now, for a same value of this stress, it may correspond to different torque values on the driving wheel, if the bicycle is equipped with a gear-changing device. Also, such a device brings about a certain amount of detrimental friction on the driving chain.

One solution which is apparently more advantageous would consist in measuring the torque transmitted by the driving wheel of a bicycle, directly on the hub of this wheel, or on some other rotary member associated with this hub. However, it is quite difficult to measure a torque on a rotating member if the sensor is mounted directly thereon. In fact, it is necessary to pass along data from this sensor to a stationary member so that these data may be processed and the results obtained thereby may be displayed. Now, the connection to be provided between the rotating member and the stationary member gives rise to problems which are very difficult to overcome in the case of the hub of a bicycle rear wheel. Thus, if use is made of strain gauges of the resistive type, which are often used for measurements of this kind, their utilization brings about friction and drift in the measured values, because of the need to provide a rotating electrical commutator for picking up data from a rotating piece.

For circumventing this problem, DE No. 3,150,149 discloses a measuring system which carries out an optical measurement of the torsion of a bicycle wheel hub between a driving part of this hub and a driven part thereof, this torsion resulting from the transmitted torque. However, this solution is relatively complex and costly, and it presents a number of drawbacks. Thus, this system is particularly bulky, owing to the presence of the optical measurement elements. Moreover, the electrical power consumed by this system is far from negligible. Finally, due to the very fact that the driving member and the driven member of the hub are extremely close to each other, the angular deviations between these two members are very small, so that precise measurements are not possible.

This is why the present invention has for its object a bicycle driving wheel provided with a torque measurement system designed for avoiding the drawbacks of the various prior systems recalled in the foregoing. Moreover, the design of this system is such that it is relatively inexpensive.

SUMMARY OF THE INVENTION

The present invention has for its object a driving wheel for a bicycle or the like, characterized in that:

there is provided between a first member of the driving mechanism, said first member being coupled with the sprocket(s) of this wheel, and a second member mounted axially slidable on the stationary shaft of the hub and rotatably coupled with said first member and with the hub, one or several cams or the like adapted for causing an axial thrust which tends to move apart these two members as a result of the rotation imparted to said members, and in that means for sensing the value of a thrust effort are arranged in registry with one of said members, said sensing means being carried by a non-rotating part and being connected to a measurement system adapted for determining from the sensing data the value of the driving torque applied to the wheel, or of another magnitude associated with said torque.

Thus, the measurement of the torque transmitted by the wheel according to the present invention is achieved by detecting the value of an axial thrust strain against a stationary member, which avoids the difficulties encountered when attempting to measure the value of this torque by means of a sensor located directly on a rotary part. In fact, in the present case, the electrical connection of the sensing means with the system for processing the sensing data presents no difficulty whatever.

In one advantageous embodiment, the sensing means are located in registry with the first rotary member of the driving mechanism, while a thrust bearing of the ball or needle type is interposed therebetween.

In such a case, the sensor for detecting the thrust strains may advantageously consist in a hollowed-out flexible disc mounted on the stationary shaft of the wheel hub, and carrying one or several strain gauges connected into the circuit of the measuring system.

According to a further feature of the present driving wheel, the rotational coupling of the second member of the driving mechanism with the wheel hub is effected by coupling means which are active solely in the driving direction, and sufficient clearance is provided for allowing the hub to freewheel.

However, the present invention also has for its object a bicycle or the like comprising a driving wheel such as defined hereabove, this bicycle being equipped with means for processing and displaying the data originating from the sensing system provided in this wheel.

Further features and advantages of the invention will appear from the following description, given by way of example, with reference to the appended drawing in which:

FIG. 4 is a partly cut-out view of a detail of this mechanism shown while it drives the wheel hub;

FIG. 5 is a view similar to FIG. 4 illustrating the operation of the freewheeling system provided in this mechanism;

DETAILED DESCRIPTION OF THE INVENTION

Figure 1:
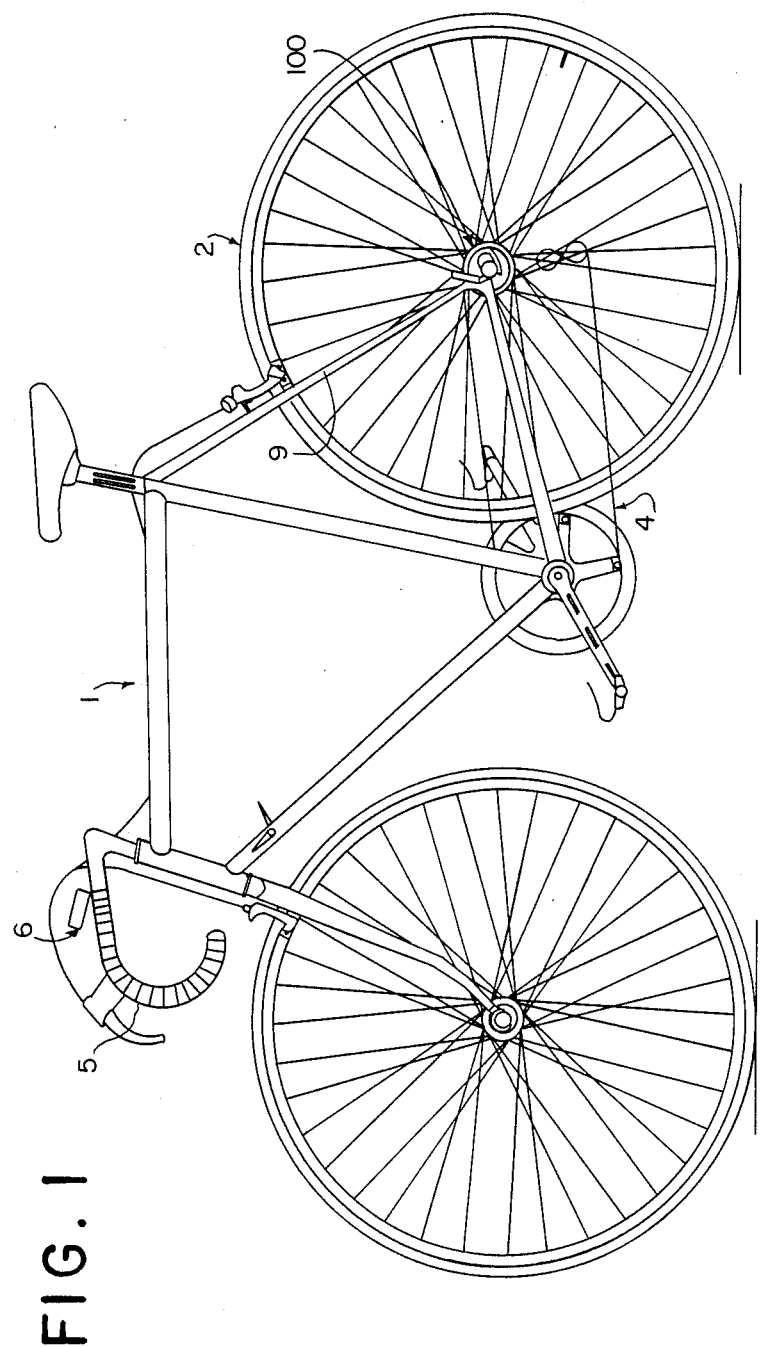
FIG. 1 is a side elevation view of a bicycle equipped with a driving wheel according to this invention.

The bicycle 1 shown in FIG. 1 comprises a driving rear wheel 2 with a driving mechanism 100 which includes the sensing system such as defined in the foregoing. This mechanism drives the hub 3 from one or several sprockets receiving the driving chain 4. The handlebar 5 of the bicycle carries a housing 6 containing the means for processing the incoming data from the sensing means provided in the driving mechanism of the rear wheel 2, while this housing also carries a dial 7 for display of the results obtained.

In the customary manner, the hub 3 of the rear wheel is rotatably mounted about a fixed axle 8 disposed between the two branches of the rear fork of the frame 1. In the example shown, the mechanism for driving this hub comprises a series of sprockets for receiving the driving chain 4, which are located on one side of the hub 3. One of these sprockets 10 is screwed onto a sleeve 11 serving as a support for the assembly. This sprocket 10 is thus holding in place the other sprockets 12 which are also rotatably bound up with the sleeve 11. This sleeve 11 is rotatably mounted around the corresponding end of the axle 8 by means of a grease-tight ball bearing 13 placed on the outer side and of a needle bearing 14 located on the opposite side.

The mechanism for driving the hub 3 comprises a first rotary member 15 which consists in a crown carrying teeth which engage longitudinal grooves in the inner wall of the sleeve 11 for rotatably coupling said member 15 with the sleeve 11. In registry with the crown 15 is provided a second rotary member formed of a ring 16, also slidably mounted on the fixed axle 8. These two members 15 and 16 are rotatably coupled together by means of teeth or protrusions, respectively 17 and 18, provided on their confronting faces, these two sets of teeth meshing together.

On its side opposite to the crown 15, the ring 16 is in registry with a bushing 19 rotatably coupled with the hub 3. This bushing 19 is rotatably mounted on the axle 8 by means of a needle bearing 20. The opposite end of the hub 3 comprises a cage 21 rotatably mounted on the corresponding end of the axle 8 by means of a ball bearing 22. In addition, this cage bears against an axial thrust bearing 23, in the form of a needle bearing, which is intended for supporting the axial strain applied in the corresponding direction.

The rotary coupling of the ring 16 with the bushing 19, which is coupled with the hub 3, is by means of coupling means forming a freewheel system. These coupling means consist in two mating sets of teeth 24 and 25, having the shape of sawteeth, the slant of which is such that a rotational coupling occurs only in the driving direction. In addition, there is provided between these two parts a sufficient clearance for allowing the bushing 19 to rotate freely relatively to the ring 16 in freewheel operation, while the teeth 25 of the bushing 19 will then push back the teeth 24 of the ring 16, as shown in FIG. 5. Compression springs 26 are interposed between these two members 16 and 19 and are therefore compressed when the system operates in a freewheel manner.

According to an essential feature of the invention, the confronting faces of the two members 15 and 16, opposite to the sets of coupling teeth 17 and 18, are provided with spiral ramps 27 adapted for causing an axial thrust for spreading apart these two members 15 and 16 as a result of the rotation of these two members, relative to each other. However, instead of spiral ramps, any other type of cam could be used, as long as it is capable of applying an axial thrust when members 15 and 16 rotate, relative to each other.

On its side opposite to the hub 3, the crown 15 rests against stationary sensing means adapted for measuring the value of the thrust applied to this crown 15. In the example shown, these sensing means consist in a flexible hollowed-out disk 28 mounted on the fixed axle 8 and carrying a strain gauge 29. This flexible disk, which is immobilized against rotation, rests against a stationary washer 30, the diameter of which is such that only the internal edge of the disk 28 will contact this washer 30. On the contrary, the axial thrust from the crown 15 upon the flexible disk 28 is applied solely on the peripheral region of said flexible disk. For this purpose, the said axial thrust is transmitted through a bell-shaped crown 31, having a narrow rim 32 which presses against the disk 28, solely upon the peripheral region of said disk.

This bell-shaped crown 31 is immobilized against rotation, as well as the flexible disk 28 and the back-up washer 30. This is why the rotary crown 15 presses against the bell-shaped crown 31 through a thrust bearing or the like. In the present occurrence, this thrust bearing is a kind of needle bearing formed of a disk 33 provided with radial slots in which are arranged needles 34. In addition thereto, two washers 35 and 36 are disposed on either side of this needle bearing 33, 34, the first washer 35 being rotary and the second one 36 being stationary.

When any one of sprockets 10 or 12 is driven by the driving chain 4, this causes crown 15 and ring 16 to rotate. Owing to the spiral ramps 27 provided on these two parts 15 and 16, this rotation generates an axial thrust against ring 16, so that its saw-tooth corrugations 24 will mesh with the corresponding teeth 25 of the bushing 19, which will thus become coupled with the ring 16. The hub 3 of the rear wheel will therefore be rotatably driven.

The various members 15, 16 and 19 will then be found in the position illustrated in FIG. 4. When considering the force F acting upon one of the ramps 27, it can be found that this force can be split into a tangent component Ft and an axial component Fa. The value of these two components is obviously a function of the value of the driving torque. It will therefore be the axial component Fa, or, more precisely, the reaction due to this force, which will be measured by the disk and strain gauge 28–29.

In fact, the axial thrust due to the ramps 27 is transmitted through the crown 15 and by the bell-shaped ring 31. This ring 31 will therefore press against the peripheral region of the flexible disk 28, while this disk rests against the washer 30 solely by its internal edge. As a result, this disk 28 undergoes a flexion which is detected by the strain gauge 29.

This gauge 29 is connected by wires 37 to the measuring system provided within the above-mentioned housing 6. The diagram of this measuring system is illustrated in FIG. 6.

To this measuring system is also connected a sensor measuring the rotation velocity of the wheel hub 3. This sensor may consist in a reed-type switch 38, the closing of which is controlled by the passage of one or several magnets 39 carried by the hub 3. The connecting wires from this switch 38, as well as the wires 37 of the strain gauge 29 are placed inside a longitudinal groove provided inside the fixed axle 8, and these wires emerge through an opening 42 provided in a fixed part 43 located on the end of the axle 8 opposed to the sprockets 10 and 12. The connection of the two sensors with the measuring system will therefore raise absolutely no special difficulty whatever.

Figure 6:
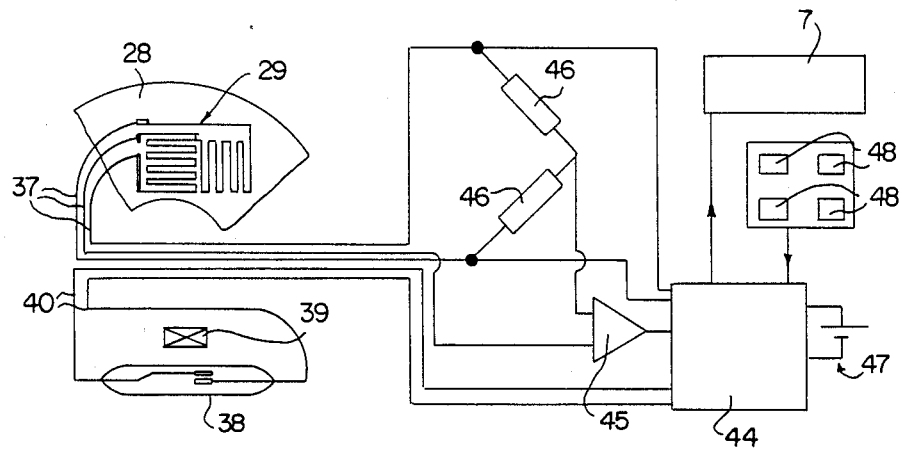
FIG. 6 is a general diagram of the data processing and display system provided on the bicycle shown in FIG. 1.

As indicated in the diagram of FIG. 6, the measuring system provided in the housing 6 comprises a microprocessor containing a program for measuring the torque transmitted to the driving wheel, on the basis of the data given by the means for detecting the axial thrust exerted by the rotary crown 15 of the driving mechanism. This circuit also includes a differential amplifier 45 and balancing resistors 46 and it is energized by one or several cells 47. The operation of this measuring system is controlled by pressing down push-buttons 48 provided on top of the housing 6. This housing also carries the dial 7 connected to the measuring circuit, and the value of the torque transmitted by the driving wheel and/or the speed of the bicycle can be displayed on this dial.

As already stated, the major advantage of the detecting system according to this invention resides in the fact that the measurement of the torque transmitted to the driving wheel relies on sensing means which are fixed. Instead of detecting the value of a driving torque in rotation, a measurement is made of a magnitude which is a function of this torque, this magnitude being, in the present occurrence, the axial component of the driving strain between the two rotating members 15 and 16. As a result, the connection of the sensing means with the measurement system raises no difficulty at all. Neither does the incorporation of these sensing means inside the driving mechanism for the wheel hub raise any difficulty.

It will however be obvious that the driving wheel according to this invention and its driving mechanism can lead to various modified embodiments. As already stated, the spiral ramps 27 could be replaced by any other system of cams or of linkage capable of producing an axial thrust for pushing apart the two members 15 and 16 of the driving mechanism as a result of the rotation of these members. For instance, it would be possible to use a screw and balls system, or again a system with rollers. On another hand, the sensing means could be designed differently, as long as they can detect the axial thrust which is to be measured. Possibly, these sensing means could be associated to the ring 16 of the driving mechanism, instead of being placed in registry with the rotating crown 15.

Figure 7:
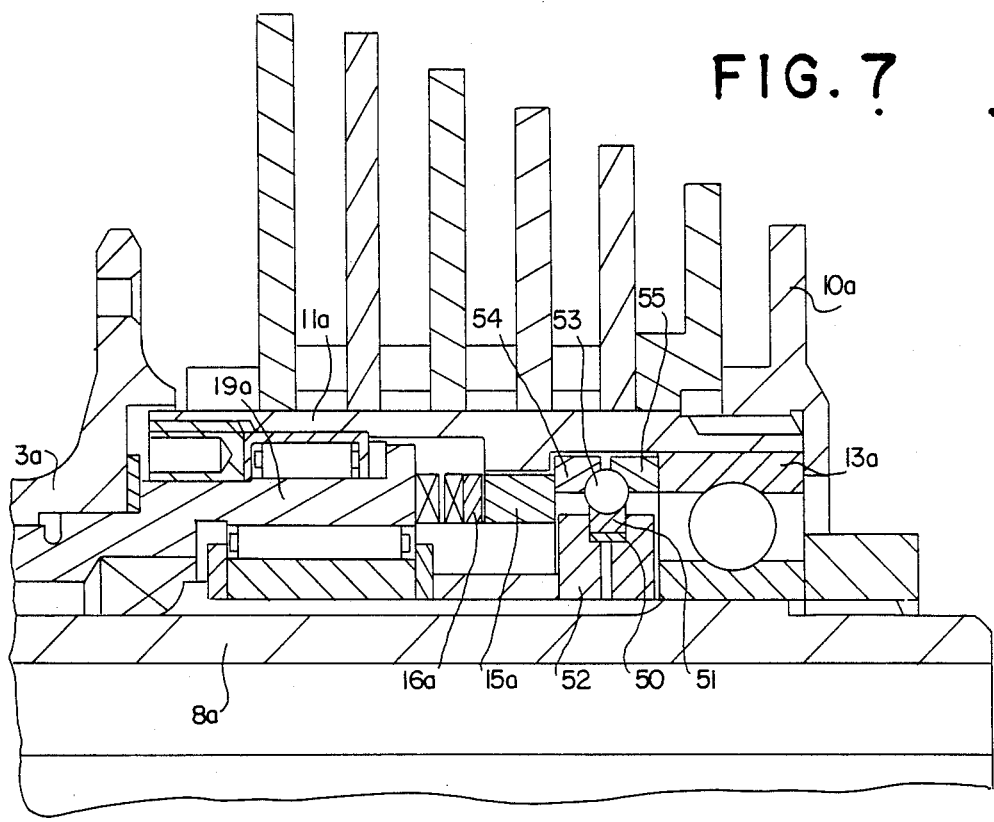
FIG. 7 is a diagrammatic view, in axial cross-section, of a modified embodiment of the driving mechanism of the driving wheel according to this invention.

FIG. 7 represents yet another embodiment of the sensing means which can be provided in the driving wheel of the invention for measuring the transmitted torque. In FIG. 7, the parts identical or equivalent to those of FIG. 2 carry the same reference number, with an "a" added thereto.

As previously described, the driving mechanism of the wheel hub 3a comprises a first rotating member, namely a crown 15a which rotates together with the sheath 11a carrying the chain sprockets. This crown 15a is identical with crown 15 previously described and is also coupled in rotation with a ring 16a. This ring 16a can be coupled by means of a free-wheel device with a sleeve 19a attached to the hub 3a. Between the two rotating members 15a and 16a is provided a cam or spiral ramp device producing an axial thrust for pushing apart crown 15a and ring 16a as a result of the rotation imparted to these members.

Figure 2:
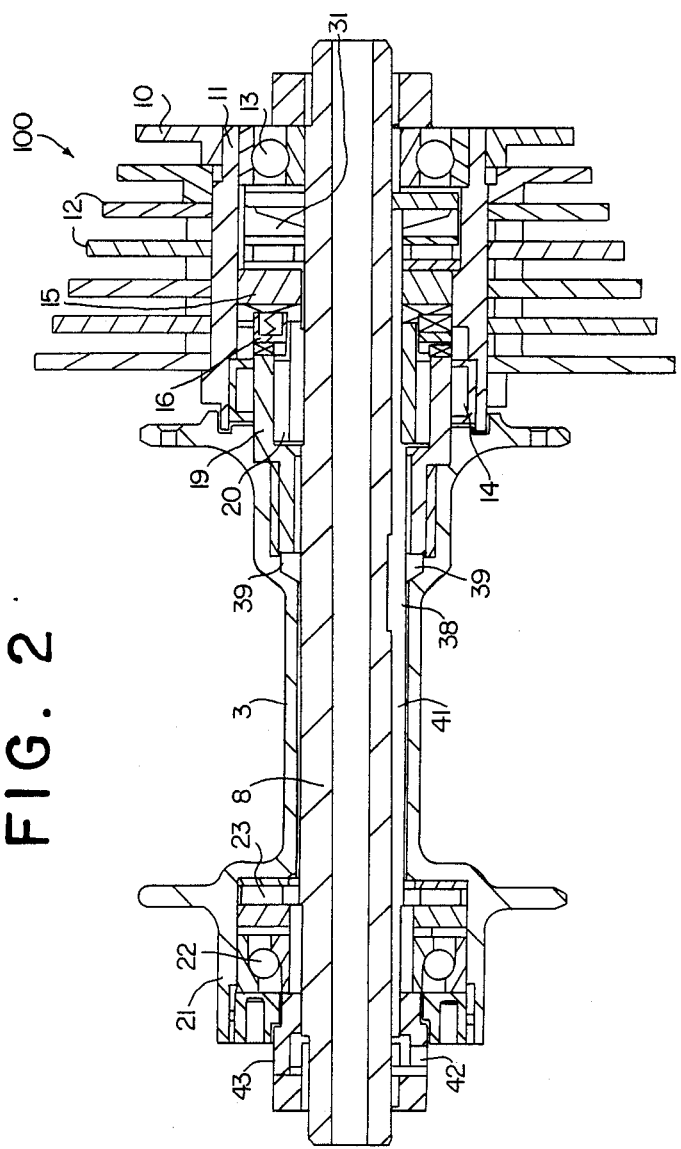
FIG. 2 is an axial cross-section of the hub of the rear wheel of this bicycle and of the hub driving mechanism.
Figure 3:
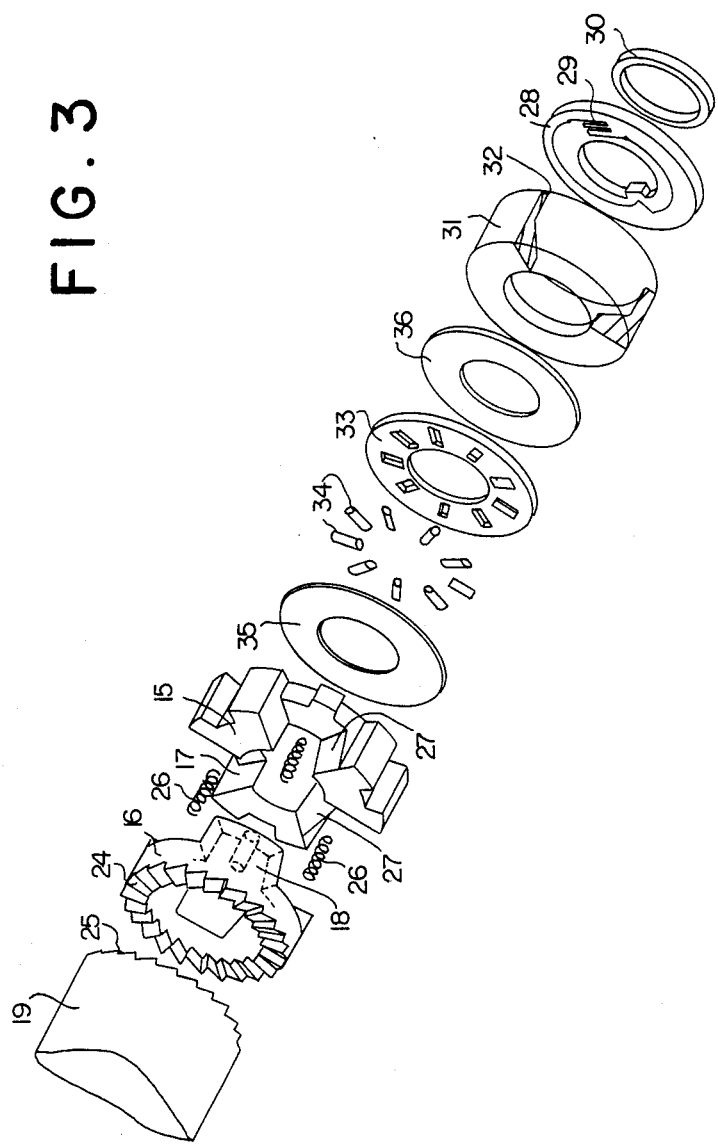
FIG. 3 is an exploded view of the main parts of this driving mechanism and of the members provided therein for detecting the value of the transmitted torque.

This mechanism differs from the one of FIGS. 2 and 3 in that its sensing means for detecting the axial thrust from the crown 15a consist in a strain gauge 50 glued on the internal wall of a ring 51 placed in a recess in the periphery of a crown 52 carried by the fixed axle 8a of the hub 3a. The ring 51 is surrounded by a series of balls 53 resting against ball races formed in two further external rings 54 and 55 on both sides of said balls 53. The external ring 55 rests against the grease-tight ball bearing 13a provided on the outer side, while ring 54 is located in registry with the rotating crown 15a.

The axial thrust from this crown 15a towards the bearing 13a on the end of the axle 8a is thus converted into a radial thrust by the balls 53. The annular strain gauge 50 will therefore detect the value of this radial thrust. Obviously, this gauge 50 is connected in the same way as gauge 29 in the first embodiment, to the measuring system provided in the housing 6.

However, many other detection systems may be adapted for measuring the axial thrust exerted by the crown 15 or 15a as it is driven in rotation. It will also be recalled that this invention has for its object, not only driving wheels of bicycles such as described hereabove, but also bicycles and the like equipped with such wheels and comprising a device for measuring the transmitted torque or a magnitude associated therewith, as a function of the data issuing from the sensing means provided in the driving wheel.

What is claimed is:

1. A driving wheel for a bicycle or the like, in which a mechanism for driving a hub of said wheel, utilizing a sprocket(s) receiving a driving chain, comprises a device for measuring the transmitted torque or a magnitude associated therewith, said wheel being characterized in that:

there is provided between a first member (15, 15a) driven in rotation by the sprocket(s) (10, 12) and a second member (16, 16a) axially slidable on the fixed axle (8) of the hub (3) and rotatably coupled with said first member (15, 15a) and with the hub (3), at least one cam (27) adapted for causing an axial thrust which tends to move apart said two members as a result of the rotation imparted to said members, and in that means (29) for sensing the value of a thrust strain are arranged in registry with one of said members, said sensing means (29) being carried by a non-rotating part and being connected to a measuring system adapted for determining, from the data issuing from said sensing means, the value of the driving torque applied to said wheel, or of another magnitude associated therewith.

2. A driving wheel for a bicycle according to claim 1, characterized in that a rotational coupling of the second member (16, 16a) with the hub (3) of said wheel is made by unidirectional coupling means (24, 25) which are active solely in the driving direction, sufficient clearance being provided between said means for allowing the hub (3) to rotate in freewheel mode.

3. A driving wheel for a bicycle according to claim 1, characterized in that the sensing means are disposed in registry with the first rotating member (15, 15a) of the driving mechanism, a thrust bearing of the ball or needle type being interposed therebetween.

4. A driving wheel for a bicycle according to claim 3, characterized in that the sensing means for the thrust strain consists in a hollowed-out flexible disk (28) immobilized on the fixed axle (8) of the hub (3), said disk (28) carrying one or several strain gauges (29) connected to the measuring circuit.

5. A driving wheel for a bicycle according to claim 4, characterized in that the flexible disk (28) carrying the strain gauge(s) (29) rests against a fixed washer (30) having a smaller diameter than said disk, said washer contacting solely the inner edge of said disk, while the first rotating member (15) of the driving mechanism presses against said flexible disk (28) through the intermediary of a bell-shaped ring (31) which contacts solely the outer peripheral region of said disk.

6. A driving wheel for a bicycle according to claim 1, characterized in that the cams provided for applying an axial thrust to the second member (16) of the driving mechanism as a result of the rotation of the first member (15) consist in complementary ramps (27) having a spiral shape or a similar shape, provided on the confronting faces of said two members (15, 16).

7. A driving wheel for a bicycle according to claim 6, characterized in that the complementary ramps (27) giving rise to an axial thrust as a result of the rotation of the first rotary member (15) of the driving mechanism are provided on teeth or protrusions (18) of the contacting members (15, 16), which mesh together for causing said two members to rotate together.

8. A driving wheel for a bicycle according to claim 1, characterized in that the first member driven in rotation by the sprocket(s) (10, 12) consists in a crown (15) carrying splines which engage grooves provided in the inner wall of a sleeve (11) carrying the sprocket(s) (10, 12).

9. A driving wheel according to claim 1, characterized in that the sensing means for detecting the thrust strain consists in an annular strain gauge (50) in registry with which is disposed a member adapted for applying a radial strain thereto in response to the axial thrust from the first rotating member (15) of the driving mechanism.

10. A bicycle or the like, characterized in that it is equipped with a driving wheel according to claim 1, and in that the sensing means (29 or 50) provided inside the hub of said wheel are connected to a measuring device placed inside a housing (6) attached to the handlebar of said bicycle and comprising a dial for the display of the measurement result.

* * * * *